(12) United States Patent
Garvey

(10) Patent No.: US 6,959,802 B1
(45) Date of Patent: Nov. 1, 2005

(54) DUAL CONVEYOR PRODUCT CONVEYING AND ACCUMULATION SYSTEM

(75) Inventor: Mark C. Garvey, Cedarbrook, NJ (US)

(73) Assignee: Garvey Corporation, Blue Anchor, NJ (US)

( * ) Notice: Subject to any disclaimer, the term of this patent is extended or adjusted under 35 U.S.C. 154(b) by 57 days.

(21) Appl. No.: 10/875,540

(22) Filed: Jun. 24, 2004

(51) Int. Cl.[7] .............................................. B65G 37/00
(52) U.S. Cl. ................. 198/347.1; 198/347.4
(58) Field of Search ........................... 198/347.1, 347.4

(56) References Cited

U.S. PATENT DOCUMENTS

| | | | | |
|---|---|---|---|---|
| 6,550,602 | B2 * | 4/2003 | Steeber et al. ........... | 198/347.4 |
| 6,575,287 | B2 * | 6/2003 | Garvey et al. ........... | 198/418.6 |
| 6,612,425 | B1 * | 9/2003 | Garvey .................... | 198/347.1 |
| 6,648,124 | B1 * | 11/2003 | Garvey .................... | 198/418.6 |
| 6,725,998 | B2 * | 4/2004 | Steeber et al. ........... | 198/347.4 |

* cited by examiner

Primary Examiner—James R. Bidwell
(74) Attorney, Agent, or Firm—Stuart M. Goldstein

(57) ABSTRACT

A product conveying and accumulation system employs at least one product delivery conveyor which transports products from an upstream location and another conveyor which delivers products to a downstream location. Dual U-shaped accumulator conveyors in the system are positioned to accept upstream products from the delivery conveyors and to transport the products to the downstream conveyor. The dual conveyors each have straightaway conveyor sections which are aligned parallel to each other. Accumulator sections are formed at these parallel alignments. In one configuration, the two straightaway sections of one of the dual conveyors are parallel to and in adjacent alignment with the straightaway sections of the other of the dual conveyors. In another configuration, the straightaway section of one of the dual conveyors is parallel to and in adjacent alignment with one straightaway section of the other conveyor, and the other straightaway sections of the two conveyors are parallel to and in spaced relation to each other. This permits adjustment of the spacing and angle between an accumulator section of these conveyors.

29 Claims, 2 Drawing Sheets

DUAL CONVEYOR PRODUCT CONVEYING AND ACCUMULATION SYSTEM

BACKGROUND OF THE INVENTION

Product accumulation systems are routinely used in conjunction with conveyors for the storage and accumulation of products which are fed from an upstream source onto conveyors. In the normal operation of this type system, products are placed on a conveyor at the upstream location, for instance at one operational station, and then transported to a downstream location by conveyor where the next step in the manufacture or distribution of the products is to be accomplished.

It is not uncommon that, during this process, there may be a disruption at a downstream location caused by a malfunction of machinery, some constraining problem, or other circumstance which prevents downstream machine from accepting products. Continued operation of production upstream may result in the build-up of line back pressure which could cause a further problem in permitting the unrestricted movement of products. However, if such a disruption is one which can be addressed relatively quickly, upstream products which normally would be transported to the malfunctioning location, can be received and temporarily stored by an accumulator which is integral to the system.

By employing such an accumulator, the upstream machinery can continue to operate by moving products to the accumulator. Since product movement can continue, there is no build-up of line pressure. Such a system also saves the substantial time and expense which would result in having to shutdown and then restart the entire system, if no accumulator was otherwise available.

As products are being received and retained by the accumulator, the downstream problem can be addressed. When that part of the system resumes full operation, the products stored in the accumulator are released to the downstream destination, with little downtime to the system. Products can also be received and stored at the accumulator in case there is an upstream disruption. In this case, accumulated products could be retained and sent downstream in order to keep the system operational while the upstream problem is being remedied.

There are several types of commonly used accumulator systems which perform the above described functions. However, these systems have significant disadvantages. One such system is an inline conveyor which allows products to build up either in single file or en masse in front of the constraining operation. If the products are stored in single file, the amount of storage is minimal and the build-up of line pressure can be problematic for the downstream machinery, as well as the products, due to damage. If products are stored inline and en masse, the amount of storage is increased, however, the line pressure increases as well and the added requirement of putting the products back into single file is required. This creates the possibility of lost production due to jamming in the single filer.

A second type is offline storage. These devices store excess products at right angles to the line in mass. As products back up on the production line, the storage device will allow product flow out onto the planar surface, which is powered away from the line during the period of accumulation. When the stored products are called for, the planar surface reverses direction and the stored products are loaded back onto the production line. This is almost always done en mass and therefore has the same inherent problems with line pressure and single filing requirements as inline storage devices.

A third type uses re-circulating storage. This type of storage device allows products to travel directly from the entry point to the exit point without interrupting the flow, until a need to store products occurs. When it does, products are re-circulated by means of two planar surfaces moving in opposite directions. Products that cannot exit the storage device are allowed to re-circulate onto the planar surface, moving in the direction which is opposite to the direction of discharge. This technique has been very effective in minimizing the amount of line pressure that can build up, as well as incorporating within the device the inherent ability to single file without a separate device to perform this function. However, due to the planar surfaces being adjacent to each other and the requirement that the products reverse direction at either end of the storage device, there are limitations to the size shape and speed of the products which can be stored on such a device. Product instability limits the application of these devices. Another factor, which limits the use of these devices is the noise and label damage generated by product-to-product contact during the re-circulating process. Products such as larger glass containers and the like create noise levels which are not acceptable in normal production environments.

The limitations and disadvantages of prior accumulator systems have been substantially overcome by the systems described in U.S. Pat. Nos. 6,575,287 and 6,612,425. These systems disclose continuous single path conveyors, uniquely configured to transport products and comprising accumulator sections to accommodate and handle excessive product loads. However, while these single product accumulator conveyors have distinct advantages, there are occasions when dual conveyors are more appropriately used, e.g. for added flexibility in system configuration and to adapt the systems for the movement of different products and product containers.

SUMMARY OF THE INVENTION

It is thus the object of the present invention to provide additional flexibility and alternatives for product conveying and accumulation systems by the use of uniquely configured dual conveyors for these systems.

It is an object of the present invention to provide a dual conveyor product conveying and accumulation system which allows products to be received, stored, and accumulated during the production process, thereby efficiently and effectively reducing the adverse effects of downstream and upstream disruptions, including machine malfunctions, on the output of the production process.

It is a further object of the present invention to provide a dual conveyor product conveying and accumulation system in which products of various sizes and shapes have the ability to re-circulate in a system, so as to minimize the build-up of line pressure.

It is still a further object of the present invention to provide a dual conveyor product conveying and accumulation system which provides the ability to single file or feed multiple output lanes in single file, or en masse, at speeds much faster than had previously been available, due to the unique re-circulating capacity of the system.

It is another object of the present invention to provide a dual conveyor product conveying and accumulation system which allows products unable to be accumulated by prior systems because of the product's physical instability, to be effectively received, stored, and accumulated without damage to or disruption of the product's movement, thereby increasing the overall output of the entire production process.

It is still another object of the present invention to provide a dual conveyor product conveying and accumulation system which reduces the noise levels while conveying and accumulating during the production process.

It is a further object of the present invention to provide a dual conveyor product conveying and accumulation system which reduces product contact during product movement and results in subsequent reduction to product damage and product labeling.

These and other objects are accomplished by the present invention which consists of a product conveying and accumulation system for use with products of various sizes, shapes and stability characteristics. The system comprises at least one product delivery conveyor which transports products from an upstream location. Another conveyor delivers products to a downstream location. Dual U-shaped accumulator conveyors in the system are positioned to accept upstream products from the delivery conveyors and to transport the products to the downstream conveyor. The dual conveyors each have straightaway conveyor sections which are aligned parallel to each other. Accumulator sections are formed at these parallel alignments. In one configuration, the two straightaway sections of one of the dual conveyors are parallel to and in adjacent alignment with the straightaway sections of the other of the dual conveyors. In another configuration, the straightaway section of one of the dual conveyors is parallel to and in adjacent alignment with one straightaway section of the other conveyor, and the other straightaway sections of the two conveyors are parallel to and in spaced relation to each other. This permits adjustment of the spacing and angle between an accumulator section of these conveyors. Product guides are provided which allow for the movement of products from the upstream to downstream locations during normal operation and direct products to the accumulator sections. Any product which cannot be accepted downstream due to a disruption or malfunction is thus accumulated in the designated areas and such products are re-circulated to the areas and ultimately to the downstream location when the downstream disruption or malfunction is remedied.

The conveying and accumulation system disclosed by the present invention permits product which is inherently unstable, e.g., lightweight, but top heavy plastic containers with a high center of gravity, to be received, accumulated, and re-circulated, without these products tipping, falling over, and thus disrupting the accumulation and re-circulation process. The configuration of the various conveying elements of the system maintains these products in their upright position throughout the accumulation and re-circulation process.

Novel features which are considered as characteristic of the invention are set forth in particular in the appended claims. The invention, itself, however, both as to its design, construction and use, together with the additional features and advantages thereof, are best understood upon review of the following detailed description with reference to the accompanying drawings.

DETAILED DESCRIPTION OF THE INVENTION

Figure 1:
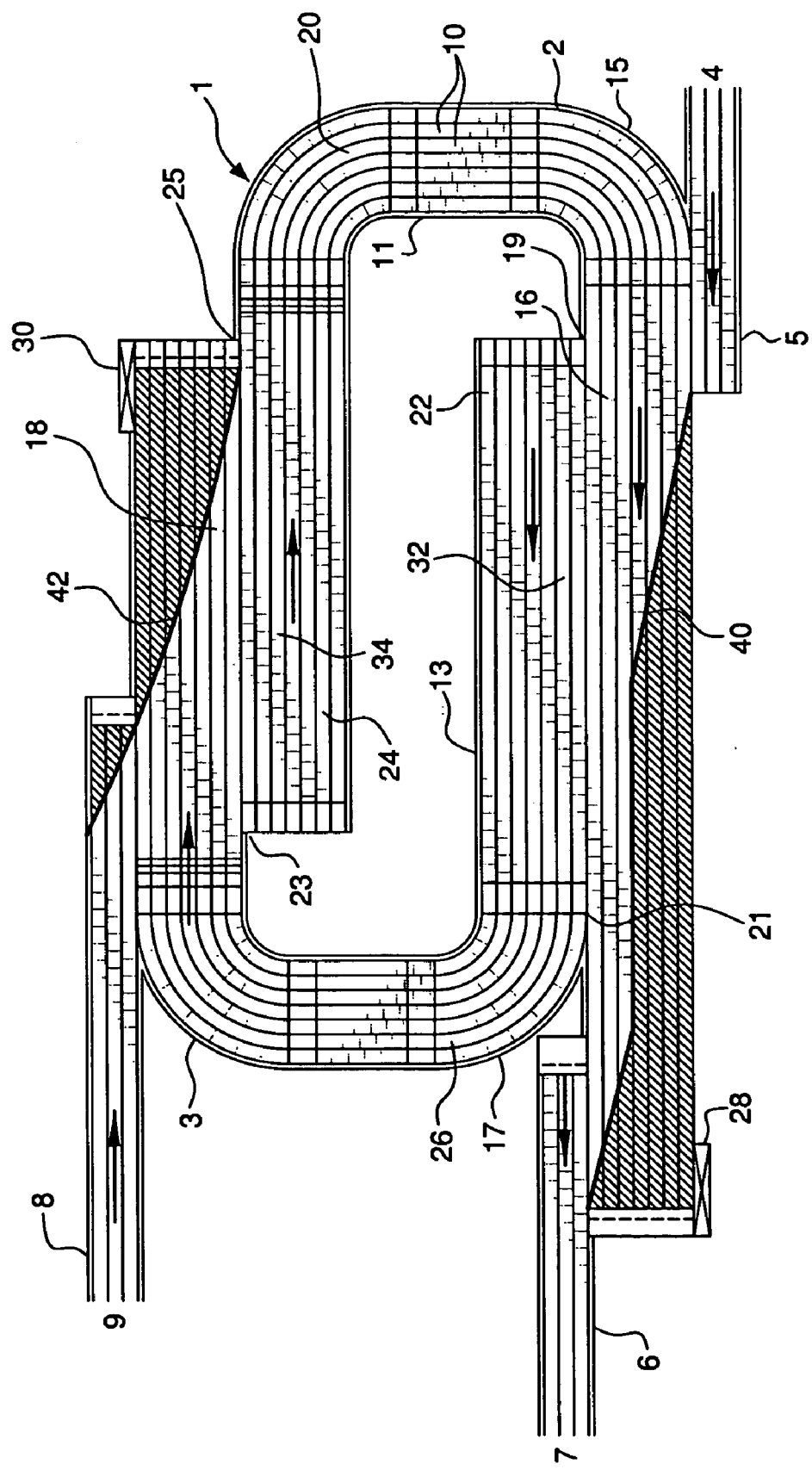
FIG. 1 is a top view of the product conveying and accumulation system of the present invention, showing the directional movement of the conveyor components of the system.

The product conveying and accumulation system 1 of the present invention comprises separate, U-shaped conveyors 2 and 3 which are configured to assist in the movement of products from an upstream location or station designated at 4, via conveyor 5. Conveyor 6 is configured to move products from system 1 to a downstream location, designated as 7. Conveyor 8, leading from upstream location 9, is shown to evidence that there may be alternate placement of conveyors in system 1 for the transport of products to and from the system. The invention is not deemed to be restrictive as to the positioning and configurations of those conveyors which provide products to system 1 from upstream to downstream destinations.

Conveyors 2 and 3 are constructed of interlocked segments 10 which are well known in the industry. Conveyor 2 comprises conveyor straightaway sections 16 and 18 which are parallel to each other and are interconnected by curved end conveyor section 20. Conveyor 3 comprises conveyor straightaway sections 22 and 24 parallel to each other and connected by curved end conveyor section 26. Conveyor straightaway sections 16 and 18 of conveyor 2 and conveyor straightaway sections 22 and 24 of second conveyor 3 are parallel to each other.

Conveyor 2 and conveyor 3 are each separate, continuous loop path conveyors. Conveyor 2 is powered for linear movement by well known drive means from a motor or other suitable power source 28 and conveyor 3 is powered for linear movement by well known drive means from a motor or other suitable power source 30. Inner guard rails 11 and 13 and outer guard rails 15 and 17 assist in receiving and maintaining product within the boundaries of conveyor 2 and conveyor 3.

As seen in FIG. 1, straightaway section 16 of conveyor 2 and straightaway section 22 of conveyor 3 are parallel and in substantial alignment with each other and are located in the same transverse plane. Straightaway section 24 of conveyor 2 and straightaway section 18 of conveyor 3 are parallel to and in substantial alignment with each other and are located in the same transverse plane. Accumulator section 32 is formed at straightaway sections 16 and 22 and accumulator section 34 is formed at straightaway sections 18 and 24. Guide 40 is designed to direct products for eventual transport onto conveyor 6 and to accumulator section 32. Guide 42 is designed to direct products from conveyor 3 onto accumulator section 34.

Power sources 28 and 30 are designed to be operable at the same speed such that conveyor 2 and conveyor 3 are moving in the same direction at the parallel alignments of conveyor straightaway sections 16 and 22 and at straightaway sections 18 and 24. Straightaway sections 16 and 22 and straightaway sections 18 and 24, located in the same transverse plane, run adjacent to each other and move in the same direction at their parallel alignments, between locations 19 and 21 and between 23 and 25, with their respective interlocking segments 10 mated in a manner which is commonly employed in the industry. The directional arrows in FIG. 1 denote the direction of movement of conveyors 2, 3, 5, 6 and 8.

In normal operation, that is when there is full production without disruption or constraint, conveyor 2 and conveyor 3 are optimally set to run in tandem, receiving products from conveyor 5 (and/or conveyor 8) and discharging them to downstream location 7 via conveyor 6. Products which cannot be readily accepted by conveyor 6 are directed by guide 40 onto accumulator section 32, where the products are recycled around conveyor 3 and returned to conveyor 2 for eventual transport to downstream station 7 via conveyor 6.

When there is a disruption of production downstream, continued upstream production and transport of product would normally cause an unacceptable build-up of line back pressure upstream. As a result, when there is such a disruption, such as a complete stoppage or slow-down of the movement of products, guide 40 can be modified, as is known in the art, to close off product discharge to downstream 7. Then, as products continue to be delivered via conveyor 5 from upstream station 4, products are directed to accumulator sections 32 and 34, where they continue to be transported by conveyor 2 and conveyor 3. As more products are fed from upstream, an increased number of products are advantageously located and stored on conveyors 2 and 3.

The speed at which the conveying and accumulation of product on system 1 is coordinated with and calibrated to the rate of upstream product feed, such that products will accumulate sufficiently on the system during the time necessary to effect repairs or otherwise remedy the downstream disruption or constraint. Since most such circumstances can be addressed within a short period, upstream production can continue during this downtime.

After the disruption or stoppage of downstream production is addressed and remedied, products can again be permitted to move onto conveyor 6. As the conveyors in the system continue to operate, products loaded onto system 1 will all eventually be directed and proceed downstream. By this process, continued full production is maintained without interruption or the need to totally shut down operation.

Figure 2:
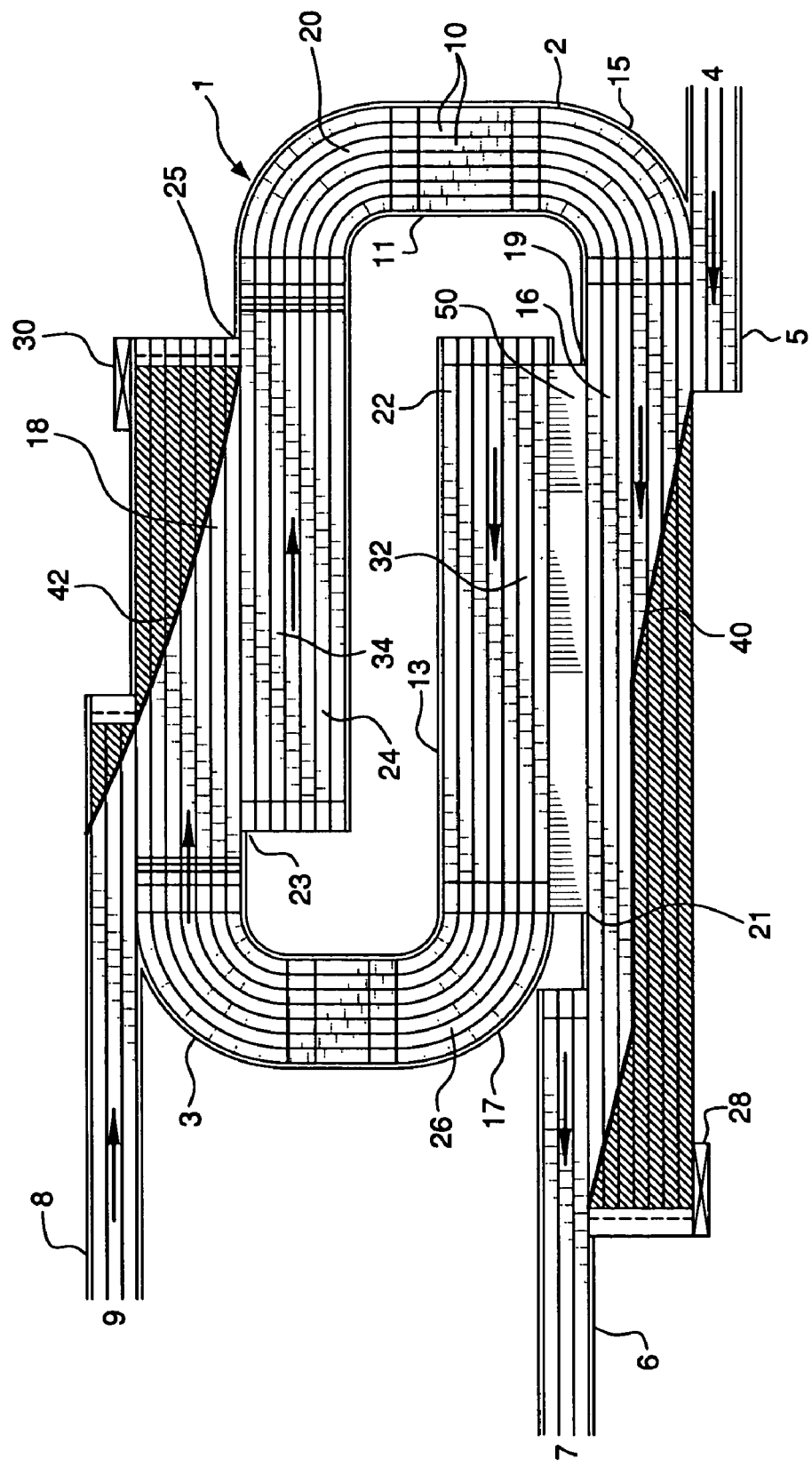
FIG. 2 is a top view of the product conveying and accumulation system of the present invention, showing an alternate embodiment of the present invention.

FIG. 2 shows an alternate configuration of the invention in which straightaway section 16 of conveyor 2 and conveyor straightaway section 22 of conveyor 3, while parallelly aligned, are located in spaced apart relation to each other. Positioning of these straightway sections in this manner allows the use of downward slide transfer plate or similar slide transfer means 50, which serves to enhance the positioning of products for accumulation and eventually transport downstream. In this configuration straightaway section 22 is located below straightaway section 16, being within a lower but parallel transverse plane, than the transverse plane within which section 16 is located. This unique feature is the subject of co-pending U.S. application Ser. No. 10/877,705.

As is common in the industry, the speed of the upstream product feed and downstream product supply are designed to be adjusted, depending on the type of product and the location of the constraint. For optimal operation, there should always be sufficient accumulated product in system 1, such that the upstream product feed is adjusted to equate to the downstream flow of the product.

The unique configuration of this system, including the design, configuration, use, and placement of the various conveyors operating in tandem and at substantially similar speeds, effectively and efficiently moves, accumulates and at all times maintains the upright position of products, like plastic containers, whose inherent high center of gravity causes them to be unstable and to easily tip and fall during unguided movement. Proper operation of the herein product conveying and accumulation system will result in such products remaining upright, thus eliminating the downtime resulting from fallen product which causes disruption and often a stoppage of the system.

An additional benefit derived from conveying and accumulation system 1 is obtained by a reduction of noise level and product damage during system operation. Products which are moved on prior conveyor systems tend to contact each other, especially at turns in the conveyor. However, as products, like bottles, are moved on accumulator sections 32 and 34, and especially at curved end sections 20 and 26, the constant speed at which conveyors 2 and 3 travel causes the outboard product to become spaced apart from the inboard products. This reduces product contact and its resulting noise, and also helps to eliminate product and product labeling damage caused by product to product contact.

Three separate conveyors have been discussed herein for use in conveying products to and from system 1. However, as previously described, it is contemplated that multiple conveyors may be used, in varied configuration, to receive product from upstream and/or discharge downstream, depending on facility space configurations and restrictions and product need.

Finally, the configurations of guides 40 and 42 as shown, may optimally be used for certain designated products. However, there may be other product guide configurations which are unique to and work best for individual products. The herein application is not to be considered restrictive as to the guide configurations which may be used.

Certain novel features and components of this invention are disclosed in detail in order to make the invention clear in at least one form thereof. However, it is to be clearly understood that the invention as disclosed is not necessarily limited to the exact form and details as disclosed, since it is apparent that various modifications and changes may be made without departing from the spirit of the invention.

What is claimed is:

1. A product conveying and accumulation system, said system comprising:
   a. first conveying means for the movement of products from an upstream destination to a destination downstream of the system;
   b. second conveying means for receiving products from the first conveying means, for accumulation and movement of products on and around the second conveying means, and for delivery of products to the first conveying means for movement to the downstream destination, said second conveying means comprising a first continuous loop path conveyor located in a single substantially transverse plane, said conveyor having two parallel straightaway sections interconnected by a curved section forming a substantially U-shaped product conveying and accumulation surface and a second continuous loop path conveyor located in a single substantially transverse plane, said second conveyor having two parallel straightaway sections interconnected by a curved section, forming a substantially U-shaped product conveying and accumulation surface, the first conveyor having at least one straightaway section in substantial parallel alignment with at least one straightaway section of the second conveyor; and
   c. power means for simultaneously moving the first and second conveyors in relation to each other and to the first conveying means.

2. The product conveying and accumulation system as in claim 1 wherein at least one straightaway section of the first conveyor is parallel to and in substantial adjacent alignment with at least one straightaway section of the second conveyor.

3. The product conveying and accumulation system as in claim 1 wherein at least one straightaway section of the first conveyor is parallel to and in spaced apart relation to at least one straightaway section of the second conveyor.

4. The product conveying and accumulation system as in claim 1 wherein one straightaway section of the first conveyor is in substantial parallel alignment with one straightaway section of the second conveyor and the second straightaway section of the first conveyor is in substantial parallel alignment with the second straightaway section of the second conveyor.

5. The product conveying and accumulation system as in claim 1 wherein the two straightaway sections of the first conveyor are parallel to and in substantial adjacent alignment with the two straightaway sections of the second conveyor.

6. The product conveying and accumulation system as in claim 1 wherein one straightaway section of the first conveyor is parallel to and in spaced apart relation with one straightaway section of the second conveyor and the other straightaway section of the first conveyor is parallel to and in substantial adjacent alignment with the other straightaway section of the second conveyor.

7. The product conveying and accumulation system as in claim 1 in which the straightaway sections of the two conveyors form at least one product accumulator section at the parallel alignment.

8. The product conveying and accumulation system as in claim 1 in which the straightaway sections of the two conveyors form two product accumulator sections at the parallel alignment.

9. The product conveying and accumulation system as in claim 1 whereby the power means simultaneously moves the first and second conveyors in the same direction at the parallel alignment of their straightaway sections.

10. The product conveying and accumulation system as in claim 1 further comprising guide means for directing products from the first conveying means and for directing products to the downstream destination of the system.

11. The product conveying and accumulation system as in claim 10 wherein the guide means comprises first guide means for directing product on the first conveyor and second guide means for directing products on the second conveyor.

12. The product conveying and accumulation system, said system comprising:
　a. first conveying means for the movement of products from an upstream destination to a destination downstream of the system;
　b. second conveying means for receiving products from the first conveying means, for accumulation and movement of products on or around the second conveying means and for delivery of products to the first conveying means for movement to the downstream destination, said second conveying means comprising first and second conveyors, each conveyor located in a single substantially transverse plane and each conveyor comprising dual, substantially parallel straightaway sections interconnected by a curved section, the straightaway sections and curved sections of each conveyor forming a substantially U-shaped product conveying and accumulation surface, a first straightaway section of the first conveyor running substantially parallel to a first straightaway section of the second conveyor and the second straightaway section of the first conveyor running substantially parallel to the second straightaway section of the second conveyor;
　c. power means for simultaneously moving the first and second conveyors in relation to each other and to the first conveying means.

13. The product conveying and accumulation system as in claim 12 wherein the first straightaway section of the first conveyor runs parallel to and is in substantial adjacent alignment with the first straightaway section of the second conveyor and the second straightaway section of the first conveyor runs parallel to and is in substantial adjacent alignment to the second straightaway section of the second conveyor.

14. The product conveying and accumulation system as in claim 12 wherein the first straightaway section of the first conveyor runs parallel to and is in spaced apart relation with the first straightaway section of the second conveyor and the second straightaway section of the first conveyor runs parallel to and is in substantial adjacent alignment with the second straightaway section of the second conveyor.

15. The product conveying and accumulation system as in claim 13 wherein the first straightaway sections of the first and second conveyors and the second straightaway sections of the first and second conveyors form accumulator sections at the adjacent alignments.

16. The product conveying and accumulation system as in claim 14 wherein the first straightaway sections of the first and second conveyors and the second straightaway sections of the first and second conveyors form accumulator sections at the parallel alignments.

17. The product conveying and accumulation system as in claim 12 whereby the power means simultaneously moves the first and second conveyors in the same direction at the straightaway sections.

18. The product conveying and accumulation system as in claim 12 further comprising guide means for directing products from the first conveying means and for directing products to the downstream destination of the system.

19. The product conveying and accumulation system as in claim 18 wherein the guide means comprises first guide means for directing product on the first conveyor and second guide means for directing products on the second conveyor.

20. A product conveying and accumulation system, said system comprising:
　a. first conveying means for the movement of products from an upstream destination to a destination downstream of the system;
　b. second conveying means for receiving products from the first conveying means, for accumulation and movement of products on and around the second conveying means, and for delivery of products to the first conveying means for movement to the downstream destination, said second conveying means comprising a first continuous loop path conveyor and a second continuous loop path conveyor, the first conveyor having two conveyor sections in substantial parallel alignment with two conveyor sections of the second conveyor, two accumulator sections being formed at the parallel alignments;
　(c) means extending along substantially the full length of the parallel alignments for interconnecting the two conveyor sections of the first conveyor with the two conveyor sections of the second conveyor, and (d) power means for simultaneously moving the first and second conveyors in the same direction at the interconnected parallel alignments of the conveyor sections.

21. The product conveying and accumulation system as in claim 20 wherein one of the two conveyor sections of the first conveyor is parallel to and in substantial adjacent alignment with one of the two conveyor sections of the second conveyor.

22. The product conveying and accumulation system as in claim 20 wherein one of the two conveyor sections of the first conveyor is parallel to and in spaced apart relation with one of the two conveyor sections of the second conveyor.

23. The product conveying and accumulation system as in claim 20 wherein one of the two conveyor sections of the first conveyor is parallel to and in spaced apart relation with one of the two conveyor sections of the second conveyor and the other conveyor section of the first conveyor is parallel to and in substantial adjacent alignment with the other conveyor section of the second conveyor.

24. The product conveying and accumulation system as in claim 20 wherein the power means comprises first power means for moving the first conveyor and second power means for moving the second conveyor.

25. The product conveying and accumulation system as in claim 20 further comprising guide means for directing products from the first conveying means and for directing products to the downstream destination of the system.

26. The product conveying and accumulation system as in claim 25 wherein the guide means comprises first guide means for directing product on the first conveyor and second guide means for directing products on the second conveyor.

27. The product conveying and accumulation system as in claim 20 wherein the first and second conveyors are U-shaped in configuration.

28. The product conveying and accumulation system as in claim 20 wherein the means for interconnecting comprises interlocking conveyor segments.

29. The product conveying and accumulation system as in claim 20 wherein the means for interconnecting comprises slide transfer means for facilitating the positioning and movement of products.

\* \* \* \* \*